United States Patent [19]

Smith et al.

[11] Patent Number: 5,965,658
[45] Date of Patent: Oct. 12, 1999

[54] CARBONACEOUS FRICTION MATERIALS

[75] Inventors: W. Novis Smith, Philadelphia, Pa.; Philip Boyd, North Attleboro, Mass.

[73] Assignee: R.K Carbon Fibers Inc., Philadelphia, Pa.

[21] Appl. No.: 08/747,988

[22] Filed: Nov. 12, 1996

Related U.S. Application Data

[63] Continuation of application No. 08/460,038, Jun. 2, 1995, abandoned.

[51] Int. Cl.$^6$ ........................................................ C08J 5/14
[52] U.S. Cl. ........................... 524/496; 523/153; 523/149; 523/150; 523/152; 523/155; 523/156
[58] Field of Search ............................ 524/496; 523/149, 523/150, 152, 153, 155, 156

[56] References Cited

U.S. PATENT DOCUMENTS

| | | | |
|---|---|---|---|
| 4,490,201 | 12/1984 | Leeds | 423/447.1 |
| 4,861,809 | 8/1989 | Ogawa et al. | 523/149 |
| 4,866,107 | 9/1989 | Doxsee et al. | 523/157 |
| 5,024,877 | 6/1991 | McCullough, Jr. et al. | 428/282 |
| 5,145,888 | 9/1992 | Gong et al. | 523/155 |
| 5,292,780 | 3/1994 | Godfrey et al. | 523/152 |
| 5,306,556 | 4/1994 | Rowland | 428/293 |
| 5,356,707 | 10/1994 | McCullough, Jr. | 423/447.1 |
| 5,508,109 | 4/1996 | Patil et al. | 523/153 |

*Primary Examiner*—James J. Seidleck
*Assistant Examiner*—Olga Asinovsky
*Attorney, Agent, or Firm*—John Lezdey

[57] ABSTRACT

The instant invention provides a non-asbestos friction material and method of making therefor having from about 2 to 20 wt % of carbonaceous fibers. The remainder of the friction material is an auxiliary material and a thermosetting resin. The carbonaceous fibers are derived from oxidized polyacrylonitrile based fibers. The wt % of bond carbon in the carbonaceous fibers is about 65 to 80.

6 Claims, No Drawings

CARBONACEOUS FRICTION MATERIALS

This is a continuation of application Ser. No. 08/460,038, filed continuation Jun. 2, 1995 now abandoned.

BACKGROUND OF THE INVENTION

1. Field Of The Invention

The present invention relates generally to carbonaceous fibers for use in friction materials and methods of preparation therefor. More particularly, there is provided a friction material and method of manufacturing therefor having improved mechanical properties which are useful in the nuclear, aerospace, aircraft and industrial fields. These composites have found particular acceptance as brake pads for aircraft, railroad and racing cars.

2. Description Of The Prior Art

The interest in friction materials having non-asbestos carbon/carbon composites has rapidly increased over the past decade. These composites retain their strength, modules, and mechanical properties up to higher temperatures than other materials. Generally, phenolic resins reinforced with carbon fibers have been used as starting materials for the preparation of carbon/carbon composites. The carbonization of these composites results in shrinkage and formation of cracks in the ultimate carbon matrix. The interaction between matrix and fiber may determine whether the resultant carbon/carbon composite will behave as a brittle, flaw sensitive material, or as a tough, thermal stress resistant composite. Therefore, the properties of the matrix as well as the fiber/matrix bonding are important factors in determining the fracture behavior and final mechanical properties of the composites.

The primary cause of disc failure in multi-disc brakes that are used in aircraft and railroad cars is thermal stress caused by thermal gradients. High heat input caused by the high aircraft deceleration requirements at high speeds and under great loads results in thermal stress which often causes failure of the brakes by dishing or cracking.

Friction elements such as automotive brake linings and disc pads, railway brake blocks and clutch facings can be made by bonding a friction material with a resin. Asbestos has been used as a friction material, either as a woven fabric or in fiber form. The asbestos is often bonded with a phenolic resin. When such asbestos type friction elements are subjected to severe brake or clutch operating conditions, the high temperatures produced tend to breakdown the element with resulting wear and/or loss in frictional properties.

In spite of this, friction elements made hitherto from material other than asbestos have failed to match the performance of asbestos elements. Asbestos has conventionally been used as principal reinforcements for friction materials after being shaped and cured together with thermosetting resins and auxiliary reinforcements. Asbestos, however, is a carcinogenic substance which presents safety and health problems during both manufacture and use. Under these circumstances, demand has increased for non-asbestos friction materials. Friction materials generally are required to have friction coefficients of from 0.3 to 0.5 to ensure high wear resistance and mechanical strength at temperatures of about 500° C.

Conventional friction materials molded from a mixture of asbestos fibers, thermosetting resins and/or vulcanizable elastomers, particulate fillers and friction modifiers are not normally consolidated to achieve the theoretical densities of the mixtures. These mixtures usually contain proportions of voids, even when cured at temperatures of up to 160° C. and pressures of up to 3 tons per square inch. The presence of voids, especially when interconnected to produce a permeable structure, is desirable to produce materials with good resistance to "fade". That is, a reduction in the coefficient of friction occurs when the friction materials operate at high temperatures.

In recent years, carbon fibers and aramid fibers have come to be preferred over asbestos as fiber materials for use in friction materials such as automotive disk brake pads, clutch facings and the like. This is because the carbon and aramid fibers have superior anti-fade properties when compared to asbestos, while maintaining favorable wear properties.

U.S. Pat. No. 3,650,357 to Nelson et al, which is herein incorporated by reference, discloses the making of an aircraft disc brake in which each disc of the brake stack is made from a carbon-based material having high specific heat, low density, low thermal expansion properties and good thermal stability over a wide range of load characteristics.

U.S. Pat. No. 4,490,201 to Leeds, which is herein incorporated by reference, discloses a method of making a carbon composite wherein a fabric comprised of oxidized or stabilized polyacrylonitrile (PAN) is heat treated to totally carbonize the fabric and then coated with a resin. The carbon fabric is then further heat treated to thermally fuse the resin to the fabric.

U.S. Pat. No. 5,051,300 to Rousseau discloses a carbon/carbon composite for use as a high performance heat protector which contains an outer coating of SiC.

A variety of fibrous materials have been used as non-asbestos materials. For example, the known art uses preoxidized fibers produced by heat-treating acrylic polyacrylonitrile (hereinafter "PAN") fibers at from about 200° to 400° C. in air. However, the preoxidized fibers with a tensile strength of from about 1 to 3 g/d and a tensile modules of elasticity of from about 50 to 150 g/d are not satisfactory as fibrous reinforcement materials. In particular, the fibers are appreciably low in tensile modulus of elasticity as compared with asbestos. In addition, the weight of the fibers reduces at about 500° C., which is the temperature that should be withstood by friction materials. Furthermore, the fibers have a tendency to form cracks in the surface of the friction material due to effluent gas and shrinking in volume of the fibers.

The use of carbon fibers derived from PAN as fibrous reinforcement materials has also been disclosed, for example, in U.S. Pat. No. 4,259,397. The carbon fibers are usually produced by calcining oxidized fibers at 1000° C. or higher in an inert gas to obtain fibers having a carbon content of at least 90 wt % and a bond nitrogen content of from about 1 to 8 wt %. These fiber types typically exhibit a tensile strength of at least about 13 g/d, a tensile modulus of elasticity of from about 1,400 to 1,800 g/d and an electric specific resistivity of no more than about 0.01 ohm-cm. However, when they are used as reinforcement for friction materials, the carbon fibers provide low friction coefficients, properties that are disadvantageous to braking and power transmission. Moreover, the carbon fibers have the further disadvantage that their high heat conductivity causes increased heat transfer to the support of a friction material or the mating member (usually made of a metal), thereby impairing the mechanical characteristics of the mating member. Generally, PAN based carbon fibers contribute to the stabilization of the coefficient of friction of the friction material at high temperatures.

The following U.S. Patents are also typical of the prior art and are all incorporated herein by reference:

U.S. Pat. No. 5,004,497 to Shibata et al discloses a friction material containing 0.85 to 30% by weight of carbon fibers and 2 to 20% by weight of aramid fibers. U.S. Pat. No. 4,861,809 to Ogawa et al teaches a friction material containing from about 0.5 to 29% weight of carbonaceous fibers with a bond nitrogen content of from about 14 to 21% weight, which have been made carbonaceous while under tension, an auxiliary material and a thermosetting resin. Carbonaceous fibers formed under tension, however, have voids and cracks thereby degrading their mechanical strengths. U.S. Pat. No. 5,292,780 to Godfrey et al describes a friction material and a binder, wherein the binder is a blend of polyvinyl alkyl ether and a phenolic resin. Optionally, the binder could further include a rubber. U.S. Pat. No. 4,656,203 to Parker describes a non-asbestos friction material having reinforced fibers embedded in a matrix of binder material.

Although the foregoing references exemplify the advancements which have been made in the art of friction materials, there nonetheless exists a long felt need to provide an improved non-asbestos friction material. The present invention is concerned with improved non-asbestos carbonaceous resin composites suitable for the preparation of friction elements, and friction elements prepared therefrom. These friction elements may be employed in the form of a fiber, a paper, a spun yarn or the like.

It is therefore an object of the instant invention to provide improvements in the art of friction materials which employ non-asbestos materials.

It is a further object of the instant invention to provide a friction material having low thermal conductivity, high thermal stability, high electrical resistivity, high bond strength and improved coefficient of friction properties.

We have found that these and other objects of the instant invention can be attained using oxidized polyacrylonitrile based carbon fibers as described below.

SUMMARY OF THE INVENTION

The instant invention provides a non-asbestos friction material and method of manufacturing therefor having from about 2 to 20 wt % of electrically non-conductive carbonaceous fibers, the remainder being a thermosetting resin and an auxiliary material. The carbonaceous fibers are derived from oxidized or stabilized polyacrylonitrile (hereinafter "PAN") based fibers and contain from about 65 to 80 wt % of bond carbon. The carbonaceous fibers are partially carbonized by heat treating, without tension, the oxidized PAN based fibers under an inert atmosphere at an effective temperature for an effective amount of time under conditions described in U.S. Pat. No. 5,233,736, which is incorporated herein by reference. The carbonaceous fibers may be sized or unsized. Advantageously, the friction material contains about 1 to 10% by weight of aramid fibers, preferably KEVLAR (trademark of DuPont).

The advantages and objects of the instant invention will become evident by referring to the following description and claims.

DETAILED DESCRIPTION OF THE PREFERRED EMBODIMENTS

The carbonaceous fibers suitable for use in the instant invention may be prepared from carbon-based fibers that are either oxidized PAN or partially carbonized PAN. The carbonaceous fibers are partially carbonized by heat treating, without tension and under an inert atmosphere such as nitrogen, the oxidized PAN based fibers at an effective temperature for an effective amount of time. Advantageously, the temperature should be from about 500 to 1000° C. in order to maintain a good coefficient of friction, elasticity and low thermal conductivity. Usually the fibers are heated to about 600° C. for optimum results. This is the minimum amount of curing needed to get superior friction proof properties. Preferably, the resulting carbonaceous fibers contain bond carbon in an amount of from about 65 to 80 wt %.

Advantageously, the carbonaceous fibers are milled to a median length of from about 0.1 to 0.5 mm. Alternatively, the carbonaceous fibers may be chopped to lengths of from about 0.5 mm to 50 mm. The fibers may be unsized or sized. Sizing gives the advantage of improved adhesion and/or dispersion to the binder and other materials used in the friction material.

The carbonaceous fibers described above are useful as additives to friction materials. In particular, a composition of preferably from about 2 to 20 wt % of carbonaceous fibers, and most preferably from about 2 to 15 wt % of carbonaceous fibers, is added to an auxiliary material and a thermosetting resin to produce a friction material. The resulting friction material is essentially non-conductive and resistant to melting and fusing. Furthermore, the friction material has high bond strength and an electrical specific resistivity of greater than $10^0$ ohm-cm. The resistivity is advantageously between from about $10^6$ ohm-cm and $10^0$ ohm-cm. Thus, the instant invention provides a non-asbestos friction material having low thermal conductivity, high thermal stability, high electrical resistivity and high bond strength. Furthermore, the coefficient of friction is higher when compared to conventional carbon fiber products that are heated to higher temperatures and contain 85–99% of bond carbon.

PAN based fibers are formed by conventional methods such as by melt or wet spinning a suitable solution of the precursor polymer material. The PAN based fibers which have a normal nominal diameter of from about 8 to 25 micrometers are collected as an assembly of a multiplicity of continuous filaments in tows. The PAN based fibers are then stabilized, for example, by oxidation or other conventional methods of stabilization. In one embodiment of the instant invention, the oxidized PAN based fibers are heat treated at a temperature of from about 500 to 1000° C. in an inert atmosphere for an effective period of time, preferably 5 to 20 minutes, to produce a partially carbonized carbonaceous fiber.

The carbonaceous fibers of the present invention are thermally stable and provide reinforcement at higher service temperatures over 200° C. without rapid breakage or degradation. Thus, these fibers are non-melting and oxidation resistant. Moreover, the fibers are thermally non-conductive or poorly conductive, which is important for friction materials so that the heat build-up is kept localized to, for example, the surface of a brake pad. Consequently, the heat will not thermally transfer to the metal surface mount of the pad, which would cause, for example, heat build-up in the more heat sensitive wheel components. Finally, the high bond strength fibers provide green strength to the brake or clutch pad when it is first made and cast prior to curing.

PAN based derived carbonaceous fibers contribute to the stabilization of the coefficient of friction of the friction material at high temperature. The carbonaceous fibers should be less than 15 mm in diameter in order to ensure a sufficient reinforcing effect. To ensure optimum reinforcing efficacy and even distribution of carbon fibers, they should be between 0.1 mm and 9.0 mm in length.

The friction materials contemplated by the instant invention include 2 to 20 wt % of the above mentioned carbonaceous fibers, the remainder being thermosetting resins and an auxiliary material, such as a binder. Examples of thermosetting resins include phenolic resins, urea resins, melamine resins, epoxy resins, alkyd resins, vinyl ester resins, polyester resins, xylene resins, furanic resins, condensate products of a cashew nut shell liquid and an aldehyde, and modified products thereof such as a phenol-modified melamine resins and epoxy-modified phenol resins. These and other similar type thermosetting resins are usually incorporated in an amount of from abut 5 to 35 wt %, preferably from about 10 to 30 wt %, based on the total weight of the friction material.

Auxiliary materials to be incorporated in the friction material of the present invention include fibers such as aramid, steel, alumina, alumina-silica, phosphate, potassium titanate, copper, and brass. These fibers are conventionally used as reinforcements. Copper and brass fibers are also used as anti-wearing agents. Other suitable auxiliary materials within the scope of the present invention include calcium carbonate, alumina powder and silica powder, which are used to control the friction coefficient. Furthermore, other auxiliary materials that are commonly employed in conventional friction materials may be used.

The particle size of these compounds is usually from about 0.5 to 20 $\mu$m. The fibers generally have a mean length of from about 0.1 to 6 mm and a mean diameter of from about 5 to 20 $\mu$m. The amount of the fibers used as an auxiliary material is generally from about 1.0 to 20 wt % based on the total weight of the friction material. The auxiliary materials are used in different amounts depending on the amounts of the carbonaceous fibers and the thermosetting resin and the characteristics thereof to obtain desired friction characteristics. With a view to providing improved friction characteristics, aramid fibers with trade names such as KEVLAR manufactured by DuPont, Conex manufactured by Teijin, TWARON manufactured by Enka and TECHNORA manufactured by Teijin are preferably incorporated as auxiliary materials in an amount of from about 0.5 to 10 wt %.

Another embodiment of the instant invention further provides an improved friction material that is made out of a carbonaceous fiber and a thermosetting resin. There is no need for any auxiliary materials. Preferably, the thermosetting resin amounts to about 80 to 25 wt % of the friction material with the carbonaceous fibers representing the remaining 20 to 75 wt %. Like before, the carbonaceous fibers are non-conductive, have a resistivity of from about $10^6$ ohm-cm to $10^0$ ohm-cm, are derived from oxidized PAN based fibers and have a bond carbon content of from about 65 to 80% by weight. Preferably, the carbonaceous fibers are partially carbonized by heat treating the PAN based fibers under an inert atmosphere, for example, nitrogen, at a temperature of up to about 1000° C. These type of fibers are particularly useful for forming paper and spun yarn types of friction materials.

The instant invention also provides a method of making an improved friction material with carbonaceous fibers derived from oxidized PAN based fibers. This method includes the following steps:

(a) milling or chopping non-conductive carbonaceous fibers having a resistivity of from about $10^6$ ohm-cm to $10^0$ ohm-cm, wherein the carbonaceous fibers are derived from oxidized PAN based fibers;

(b) mixing the carbonaceous fibers with an auxiliary material to form an uncured fiber blend composite;

(c) impregnating the fiber composite of step (b) with a thermosetting resin so that the amount of carbonaceous fibers in the friction material is from about 2 to 20 wt %; and (d) heat curing and molding the friction material.

Analogous to that described above for the friction material embodiment, the method embodiment preferably uses a carbonaceous fiber that is partially carbonized by heat treating the oxidized PAN based fibers under an inert atmosphere, for example, nitrogen, at a temperature of up to about 1000° C. Advantageously, the carbonaceous fibers contain bond carbon in the amount of from about 65 to 80 wt %. More advantageously, the amount of carbonaceous fibers used in the friction material is from about 2 to 15 wt %. Moreover, it may be preferable to mill or chop the carbonaceous fibers to a median length of from about 0.1 to 0.5 mm if milled or from about 0.5 to 50 mm if chopped. Finally, the carbonaceous fibers may be preferably sized if desired.

The following examples illustrate particular embodiments of the instant invention:

EXAMPLE 1

An automotive brake composition was made by combining 5% by volume milled natural graphite, 18% by volume melamine powder, 8% by volume copper powder, 15% by volume barium sulfate, 2% by volume silica powder, 2% by volume alumina, 7% by volume copper oxide, 3% by volume iron powder and 26% by volume phenolic powder. To this composition was added from 3% to 15% by volume carbonaceous fibers. Sufficient KEVLAR fibers were also added to adjust the total fiber addition level from about 5 to 16% by volume. The whole composition was compression molded to cure from 250° F. up to 450° F. to form a brake pad. If desired, cellulosic or acrylic fibers may be mixed with the KEVLAR.

These pads were tested for wear and friction properties and exhibited superior characteristics when compared to conventional friction materials.

EXAMPLE 2

An automotive brake pad composition was made by combining 8% by volume carbonaceous fibers and adding to that sufficient additional fibers of oxidized PAN to bring the total amount of fibers to 15% by volume, 6% by volume copper powder, 9% by volume copper-zinc alloy powder, 5% by volume powdered natural graphite, and 8% by volume molybdenum disulfide, 6% by volume silica, 12% by volume barium sulfate, 16% by volume melamine powder, and 23% by volume phenolic resin powder. This composition was compression molded and heated to about 300° F. to form a brake pad. These pads were tested for wear and friction properties and exhibited superior characteristics when compared to conventional friction materials.

Although the invention has been described with reference to certain preferred embodiments, it is understood that the present disclosure has been made only by way of example and that many variations, modifications and changes in the details of construction may be resorted to without departing from the spirit and scope of the broad principles delineated in this patent application. Hence, it is intended that the preferred embodiments and all of such variations and modifications be included within the scope and spirit of the instant invention, as defined by the following claims:

What is claimed is:

1. A compression molded brake pad material which comprises from about 2 to 20 wt % of carbonaceous fibers that have been prepared from oxidized polyacrylonitrile that have been heat treated without tension in an inert atmosphere; said carbonaceous fibers having a resistivity of from about $10^6$ ohm-cm to $10^0$ ohm-cm; the remainder of said brake pad material including powdered auxiliary material which includes metals and/or metal oxides and a powdered phenolic thermosetting resin; said carbonaceous fibers having a carbon content of from about 65 to 80% by weight and a median length of from about 0.5 to 50 mm.

2. The brake pad material as recited in claim 1, wherein said carbonaceous fibers are partially carbonized by heat treating said oxidized polyacrylonitrile fibers under an inert atmosphere at a temperature of up to about 1000° C.

3. The brake pad material as recited in claim 1, wherein said carbonaceous fibers are present in an amount of from about 2 to 15 wt % based on the total weight of the brake pad material.

4. The brake pad material as recited in claim 1, wherein said carbonaceous fibers are sized.

5. The brake pad material as recited in claim 1, wherein the amount of said carbonaceous fibers in the friction material is from about 2 to 15 wt %.

6. An improved compression molded brake material having from about 80 to 25 wt % of a powdered phenolic thermosetting resin and powdered metal and/or metal oxides and from about 20 to 75 wt % of carbonaceous fibers that have been prepared from oxidized polyacrylonitrile that have been heat treated without tension in an inert atmosphere; said carbonaceous fibers having a resistivity of from about $10^6$ ohm-cm to $10^0$ ohm-cm; wherein the improvement comprises said carbonaceous fibers having a carbon content of from about 65 to 80% by weight and a median length of from about 0.5 to 50 mm.

* * * * *